(12) United States Patent
Satpathy et al.

(10) Patent No.: US 11,941,131 B1
(45) Date of Patent: Mar. 26, 2024

(54) ISOLATION OF SECRETS FROM AN OPERATING SYSTEM

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Nagendra Gupta Modadugu, San Francisco, CA (US); Neeraj Upasani, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 99 days.

(21) Appl. No.: 17/248,883

(22) Filed: Feb. 11, 2021

Related U.S. Application Data

(60) Provisional application No. 63/132,962, filed on Dec. 31, 2020.

(51) Int. Cl.
  *G06F 21/60* (2013.01)
  *G06F 1/16* (2006.01)
  *G06F 3/01* (2006.01)
  *G06F 15/78* (2006.01)
  (Continued)

(52) U.S. Cl.
  CPC ............ *G06F 21/602* (2013.01); *G06F 1/163* (2013.01); *G06F 3/012* (2013.01);
  (Continued)

(58) Field of Classification Search
  CPC ........ G06F 21/602; G06F 1/163; G06F 3/012; G06F 15/7807; G06F 21/64; G06F 21/79; G06F 2221/0751; G06T 19/006
  See application file for complete search history.

(56) References Cited

U.S. PATENT DOCUMENTS 6,003,117 A * 12/1999 Buer .................. G06F 12/1408
  713/193
6,049,841 A * 4/2000 Fields, Jr. ............... G06F 13/30
  710/28

(Continued)

OTHER PUBLICATIONS

SD Association, SD Host Controller Simplified Specification Version 4.20, Apr. 10, 2017, pp. 15-19 (Year: 2017).*

*Primary Examiner* — Shin-Hon (Eric) Chen
*Assistant Examiner* — Ethan V Vo
(74) *Attorney, Agent, or Firm* — Greenberg Traurig, LLP

(57) ABSTRACT

An example method for execution on a system on a chip (SoC) having a plurality of subsystems includes receiving, by a storage controller from a subsystem of the plurality of subsystems, a command to fetch, from a local memory, task descriptor data comprising access parameters for accessing a storage device, the access parameters including a storage device address; obtaining, by an encryption engine of the SoC, the command to fetch the task descriptor data; determining, by the encryption engine based on an access rule, whether the subsystem has sufficient privilege to access the storage device address; in response to determining that the subsystem has sufficient privilege to access the storage device, encrypting, source data in the local memory according to an encryption key associated with the subsystem; and providing the encrypted source data to the storage controller for writing to the storage device at the storage device address.

18 Claims, 12 Drawing Sheets

(51) Int. Cl.
*G06F 21/10* (2013.01)
*G06F 21/64* (2013.01)
*G06F 21/79* (2013.01)
*G06T 19/00* (2011.01)

(52) U.S. Cl.
CPC .......... *G06F 15/7807* (2013.01); *G06F 21/64* (2013.01); *G06F 21/79* (2013.01); *G06T 19/006* (2013.01); *G06F 21/107* (2023.08)

(56) References Cited

U.S. PATENT DOCUMENTS

| | | | |
|---|---|---|---|
| 6,256,693 B1* | 7/2001 | Platko | G06F 13/4278 710/110 |
| 2003/0200451 A1* | 10/2003 | Evans | G06F 21/85 713/193 |
| 2006/0179179 A1* | 8/2006 | Suzuoki | G06F 13/28 710/22 |
| 2012/0072618 A1* | 3/2012 | Fujimoto | G06F 12/1081 710/24 |
| 2014/0006804 A1* | 1/2014 | Tkacik | G06F 9/45558 713/192 |
| 2014/0310536 A1* | 10/2014 | Shacham | G06F 21/78 713/193 |
| 2015/0161364 A1* | 6/2015 | Makarov | G06F 21/6218 726/4 |
| 2016/0028728 A1* | 1/2016 | Hampel | H04L 9/3234 713/181 |
| 2016/0364343 A1* | 12/2016 | Case | G06F 12/145 |
| 2017/0364707 A1* | 12/2017 | Lal | G06F 21/85 |
| 2018/0260343 A1* | 9/2018 | Park | G06F 13/1668 |
| 2020/0004984 A1* | 1/2020 | Lee | G06F 21/6245 |
| 2020/0167487 A1* | 5/2020 | Kida | G06F 21/76 |

* cited by examiner

ISOLATION OF SECRETS FROM AN OPERATING SYSTEM

CROSS REFERENCE

This application claims the benefit of U.S. Provisional Patent Application No. 63/132,962, filed Dec. 31, 2020, the entire contents of which are incorporated herein by reference.

TECHNICAL FIELD

This disclosure generally relates to isolating secret data from an operating system.

BACKGROUND

Many computing systems handle secure data, for example, data that is potentially sensitive, private, and/or rights-managed. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

SUMMARY

In general, this disclosure is directed to encryption engines configured to perform in-line data encryption as data is received for storage in a persistent storage device such as an embedded Multi-Media Card (eMMC). This disclosure is related to systems on a chip (SoCs) having subsystems that store secret data in persistent storage. The SoCs of this disclosure can receive data from a subsystem of an SoC and store the data in encrypted form such that the data cannot be obtained as clear text from other subsystems of the SoC. As an example, biometric data representing a fingerprint or iris scan can be encrypted as the data is being stored on an EMM by a security subsystem of the SoC. The encrypted data is secret from other subsystems on the SoC, even though the other subsystems may have access to the SoC. As an example, an application executing on a host processor subsystem of the SoC is prevented from obtaining the biometric data in clear text form.

The SoCs of this disclosure provide several technical improvements. For example, the SoCs of this disclosure can provide for secure isolation of data used by a subsystem from other subsystems on the SoC. As an example, a security subsystem may securely store biometric or other sensitive data on a storage device used by the SoC by encrypting the sensitive data using a key that is associated with the security subsystem. Other subsystems, such as a compute subsystem, cannot access the keys used by the security subsystem or other subsystems and cannot access or read the data maintained by the security subsystem.

In one example, this disclosure describes a method for execution on a system on a chip (SoC) having a plurality of subsystems includes receiving, by a storage controller of the SoC and from a subsystem of the plurality of subsystems, a command to fetch, from a local memory, task descriptor data comprising access parameters for accessing a storage device, the access parameters including a storage device address; obtaining, by an encryption engine of the SoC, the command to fetch the task descriptor data; determining, by the encryption engine and based on an access rule, whether the subsystem has sufficient privilege to access the storage device address; in response to determining that the subsystem has sufficient privilege to access the storage device, encrypting, by the encryption engine, data in the local memory using an encryption key associated with the subsystem; and outputting, by the encryption engine, the encrypted data to the storage controller for writing to the storage device at the storage device address.

In another example, this disclosure describes a system on a chip (SoC) includes a plurality of subsystems; a storage controller configured to receive, from a subsystem of the plurality of subsystems, a command to fetch, from a local memory, task descriptor data comprising access parameters for accessing a storage device, the access parameters including a storage device address; and an encryption engine configured to: obtain the command to fetch the task descriptor data; determine, based on an access rule, whether the subsystem has sufficient privilege to access the storage device address; in response to determining that the subsystem has sufficient privilege to access the storage device, encrypt source data in the local memory according to an encryption key associated with the subsystem; and output the encrypted source data to the storage controller for writing to the storage device at the storage device address.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
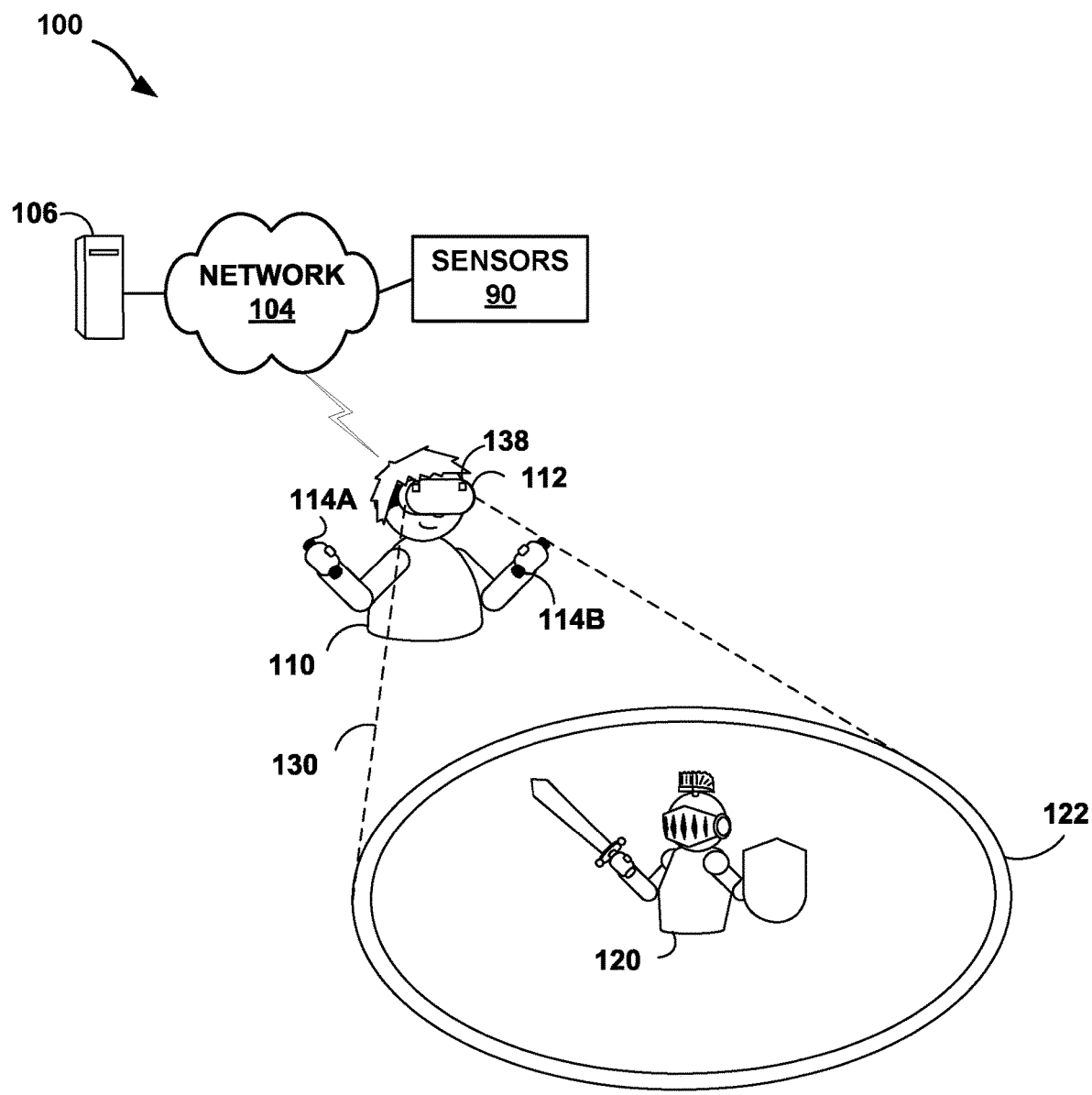
FIG. 1 is an illustration depicting an example artificial reality system that includes an SoC configured to implement in-line encryption and decryption, in accordance with techniques described in this disclosure.

FIG. 1 is an illustration depicting an example artificial reality system that includes an SoC configured to implement in-line encryption and decryption, in accordance with techniques described in this disclosure. The artificial reality system may be a virtual reality system, an augmented reality system, or a mixed reality system. In the example of FIG. 1, artificial reality system 100 includes a head mounted display (HMD) 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each of controller(s) 114 is an input device that user 110 may use to provide input to console 106, HMD 112, or another component of AR system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by AR system 100.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile AR system, and AR system 100 may omit console 106.

In general, AR system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112 and/or controllers 114, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

AR system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content alone, or overlaid with real-world objects in a scene, HMD 112 may include a display system. For example, the display may include a projector and waveguide configured to translate the image output by the projector to a location viewable by a user's eye or eyes. The projector may include a display and a projector lens. The waveguide may include an input grating coupler to redirect light from the projector into the waveguide, and the waveguide may "trap" the light via total internal reflection (TIR). For example, the display may include arrays of red, green, and blue LEDs. In some examples, a color image may be formed by combination of the red, green, and blue light from each of the red, green, and blue LED arrays via a combiner. The waveguide may include an output grating to redirect light out of the waveguide, for example, towards an eyebox. In some examples, the projector lens may collimate light from the display, e.g., the display may be located substantially at a focal point of the projector lens. The grating coupler may redirect the collimated light from the display into the waveguide, and the light may propagate within the waveguide via TIR at the surfaces of the waveguide. The waveguide may include an output structure, e.g., holes, bumps, dots, a holographic optical element (HOE), a diffractive optical element (DOE), etc., to redirect light from the waveguide to a user's eye, which focuses the collimated light from the display of the projector on the user's retina, thereby reconstructing the display image on the user's retina. In some examples, the TIR of the waveguide functions as a mirror and does not significantly affect the image quality of the display, e.g., the user's view of the display is equivalent to viewing the display in a mirror.

As further described herein, one or more devices of artificial reality system 100, such as HMD 112, controllers 114 and/or a console 106, may include one or more SoCs. Further, one of more of the SoCs may comprise an SoC configured to perform in-line encryption and decryption of secrets (e.g., secret data) that are isolated from an operating system in accordance with the techniques described herein. As used herein, the term "isolated from" may mean the secret is not available in clear text (e.g., unencrypted form) to components of an operating system, and does not necessarily mean that the operating system cannot access the secret data. For example, the secret data can be stored in a memory accessible by the operating system, but the secret data cannot be decrypted by the operating system.

Figure 2A:
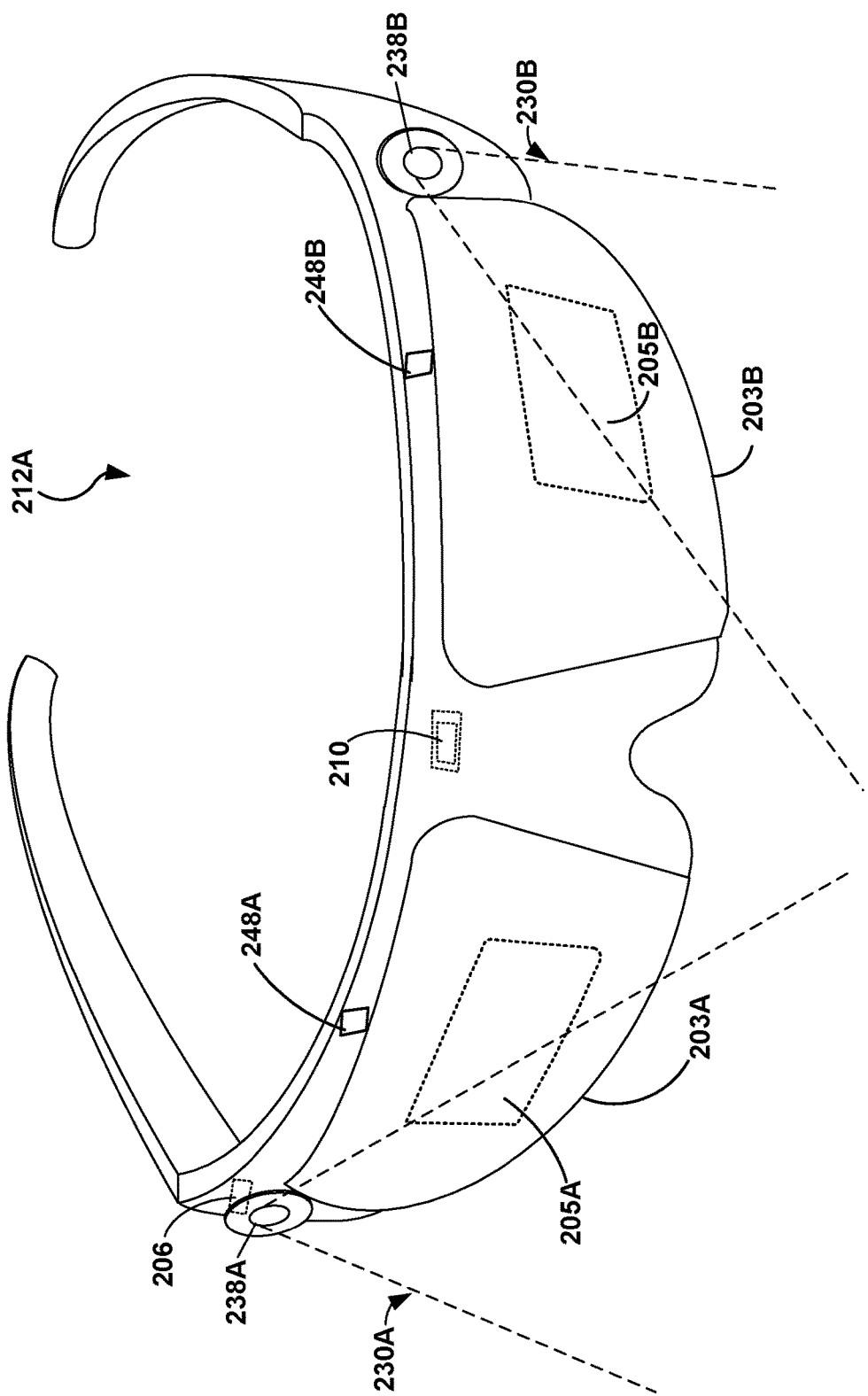
FIG. 2A is an illustration depicting an example HMD that includes an SoC configured to implement in-line encryption and decryption, in accordance with techniques described in this disclosure.

FIG. 2A is an illustration depicting an example HMD that includes an SoC configured to implement in-line encryption and decryption of secrets that are isolated from an operating system, in accordance with techniques described in this disclosure. HMD 212A of FIG. 2A may be an example of HMD 112 of FIG. 1. As shown in FIG. 2A, HMD 212A may take the form of glasses. HMD 212A may be part of an artificial reality system, such as AR system 100 of FIG. 1, or may operate as a stand-alone, mobile artificial realty system configured to implement the techniques described herein.

In this example, HMD 212A are glasses comprising a front frame including a bridge to allow the HMD 212A to rest on a user's nose and temples (or "arms") that extend over the user's ears to secure HMD 212A to the user. In addition, HMD 212A of FIG. 2A includes one or more waveguides 203A and 203B (collectively, "waveguides 203") and one or more waveguide output structures 205A and 205B (collectively, "waveguide output structures 205") configured to redirect light out of the waveguides 203A and 203B. In the example shown, projectors 248A and 248B (collectively, "projectors 248") may input light, e.g., collimated light, into waveguides 203A and 203B via a grating coupler (not shown) that redirects light from the projectors 248 into waveguides 203 such that the light is "trapped" via total internal reflection (TIR) within the waveguide. For example, projectors 248A and 248B may include a display and a projector lens. In some examples, waveguides 203 may be transparent and alternatively may be referred to as "windows 203" hereinafter. In some examples, the known orientation and position of windows 203 relative to the front frame of HMD 212A is used as a frame of reference, also referred to as a local origin, when tracking the position and orientation of HMD 212A for rendering artificial reality content according to a current viewing perspective of HMD 212A and the user. In some examples, projectors 248 can provide a stereoscopic display for providing separate images to each eye of the user.

In the example shown, waveguide output structures 205 cover a portion of the windows 203, subtending a portion of the field of view 230 viewable by a user 110 through the windows 203. In other examples, the waveguide output structures 205 can cover other portions of the windows 203, or the entire area of the windows 203.

As further shown in FIG. 2A, in this example, HMD 212A further includes one or more motion sensors 206, one or more integrated image capture devices 238A and 238B (collectively, "image capture devices 238"), an internal control unit 210, which may include an internal power source and one or more printed-circuit boards having one or more processors, memory, and hardware to provide an operating environment for executing programmable operations to process sensed data and present artificial reality content on waveguide output structures 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In some aspects, the SoC may perform in-line encryption of data received in a memory of the SoC such that the encrypted data is isolated from an operating system hosted on a subsystem of the SoC.

Image capture devices 238A and 238B may include devices such as video cameras, laser scanners, Doppler radar scanners, depth scanners, or the like, configured to output image data representative of the physical environment. More specifically, image capture devices 238 capture image data representative of objects in the physical environment that are within a field of view 230A, 230B of image capture devices 238, which typically corresponds with the viewing perspective of HMD 212A.

Figure 2B:
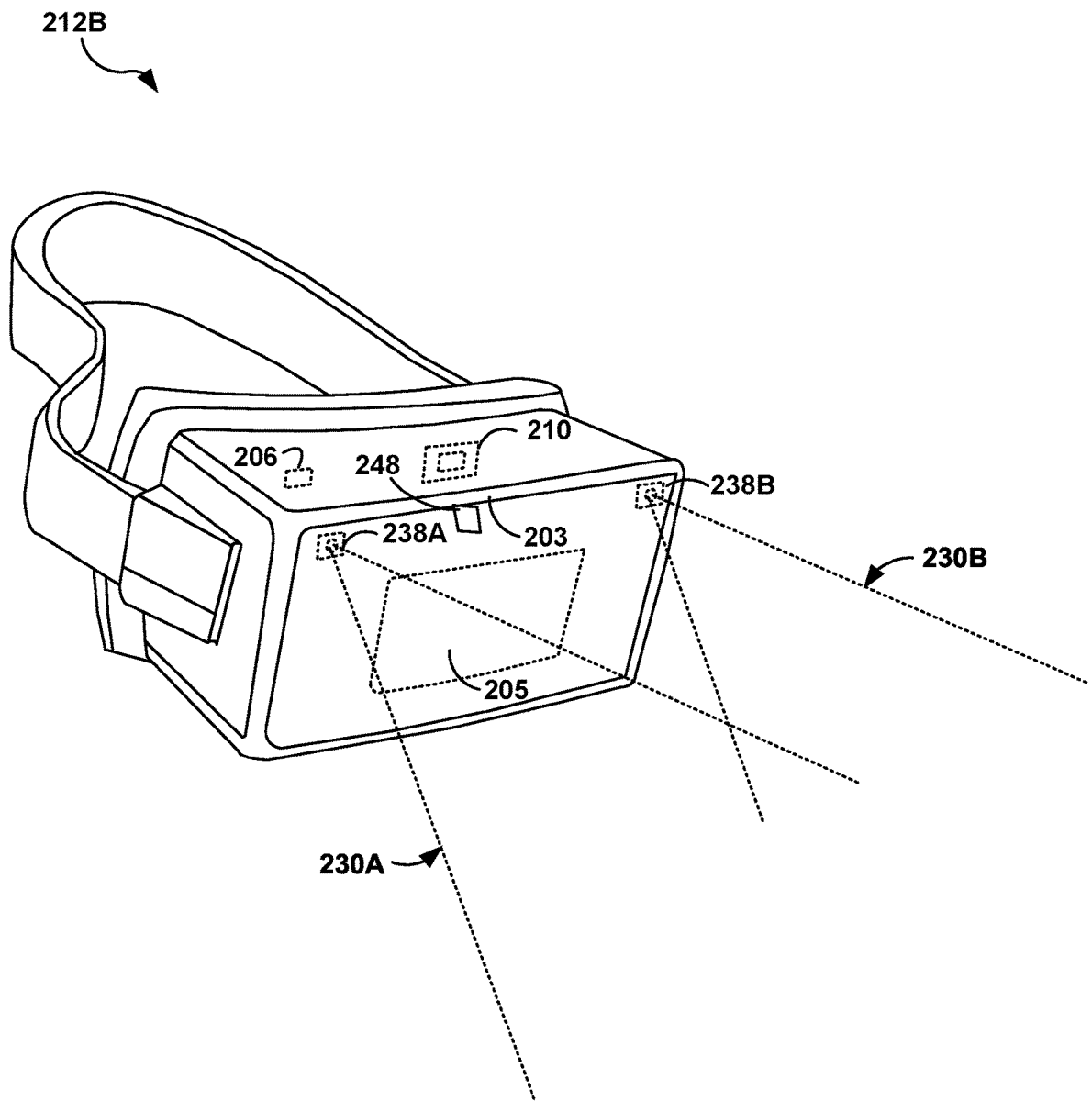
FIG. 2B is an illustration depicting another example HMD that includes an SoC configured to implement in-line encryption and decryption, in accordance with techniques described in this disclosure.

FIG. 2B is an illustration depicting another example HMD that includes an SoC configured to implement in-line encryption and decryption of secrets that are isolated from an operating system, in accordance with techniques described in this disclosure. HMD 212B may be part of an artificial reality system, such as artificial reality system 100 of FIG. 1, or may operate as a stand-alone, mobile artificial realty system configured to implement the techniques described herein.

In this example, HMD 212B includes a front rigid body and a band to secure HMD 212B to a user. In addition, HMD 212B includes a waveguide 203 (or, alternatively, a window 203) configured to present artificial reality content to the user via a waveguide output structure 205. In the example shown, projector 248 may input light, e.g., collimated light, into waveguide 203 via an input grating coupler (not shown) that redirects light from projector(s) 248 into waveguide 203 such that the light is "trapped" via total internal reflection (TIR) within waveguide 203. For example, projector 248 may include a display and a projector lens. In some examples, the known orientation and position of waveguide 203 relative to the front rigid body of HMD 212B is used as a frame of reference, also referred to as a local origin, when tracking the position and orientation of HMD 212B for rendering artificial reality content according to a current viewing perspective of HMD 212B and the user. In other examples, HMD 212B may take the form of other wearable head mounted displays, such as glasses or goggles.

Similar to HMD 212A of FIG. 2A, the example HMD 212B shown in FIG. 2B further includes one or more motion sensors 206, one or more integrated image capture devices 238A and 238B, an internal control unit 210, which may include an internal power source and one or more printed-circuit boards having one or more processors, memory, and hardware to provide an operating environment for executing programmable operations to process sensed data and present artificial reality content on waveguide output structure 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In some aspects, the SoC may perform in-line encryption of data received in a memory of the SoC such that the encrypted data is isolated from an operating system hosted on a subsystem of the SoC.

Figure 3:
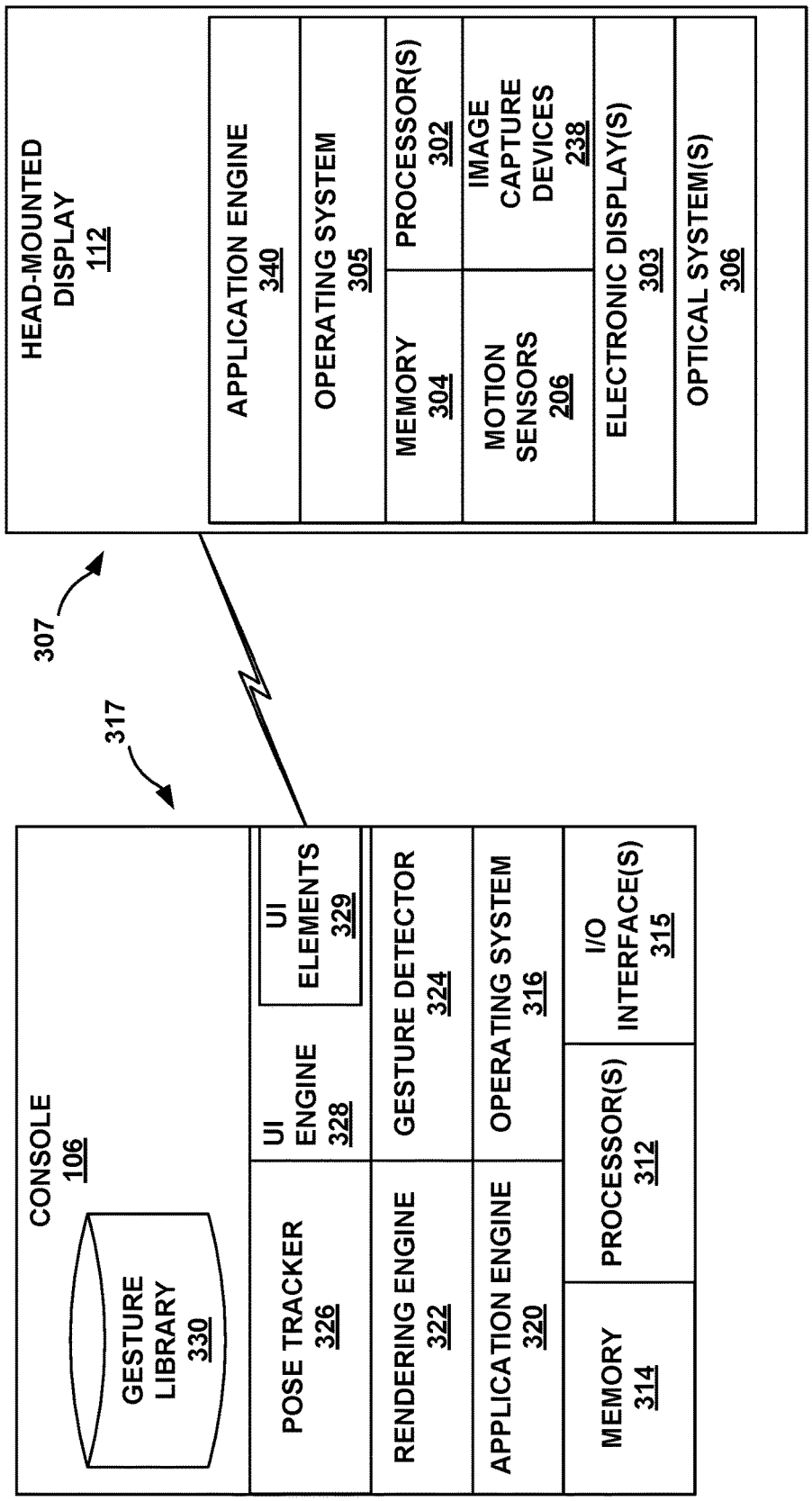
FIG. 3 is a block diagram showing example implementations of a console and an HMD of the artificial reality system of FIG. 1, in accordance with techniques described in this disclosure.

FIG. 3 is a block diagram showing example implementations of a console and an HMD of the artificial reality system of FIG. 1, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 303, motion sensors 206, image capture devices 138, and, in some examples, optical system 306. In some examples, processors 302 and memory 304 may be separate, discrete components. In other examples, memory 304 may be on-chip memory collocated with processors 302 within a single integrated circuit such as an SoC. In some examples, functionality of processors 302 and/or memory 304 for aggregating and processing sensed data may be implemented as an SoC/SRAM integrated circuit component arranged in accordance with the present disclosure.

In some examples, optical system 306 may include projectors and waveguides for presenting virtual content to a user, as described above with respect to FIGS. 2A and 2B. For example, optical system 306 may include a projector including electronic display 303 and a projection lens.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software components 317 of console 106 operate to provide an overall artificial reality application. In this example, software components 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
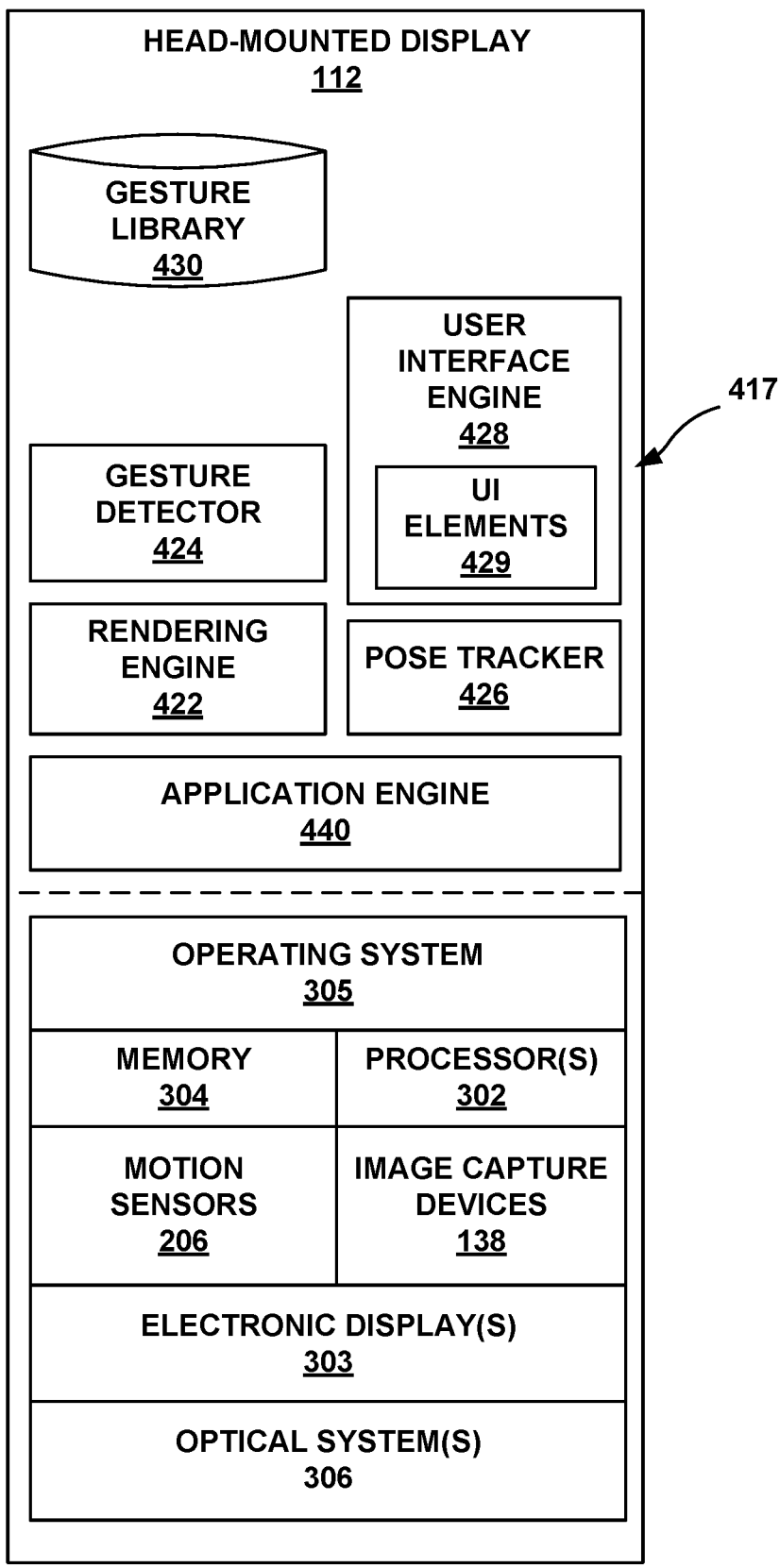
FIG. 4 is a block diagram depicting an example HMD of the artificial reality system of FIG. 1, in accordance with the techniques described in this disclosure.

FIG. 4 is a block diagram depicting an example HMD 112 of the artificial reality system of FIG. 1, in accordance with the techniques described in this disclosure. In the example shown in FIG. 4, HMD 112 is a standalone artificial reality system. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 303, varifocal optical system(s) 306, motion sensors 206, and image capture devices 138. In some examples, functionality of processors 302 and/or memory 304 for aggregating and processing sensed data may be implemented as an SoC integrated circuit component arranged in accordance with the present disclosure.

In some examples, optical system 306 may include projectors and waveguides for presenting virtual content to a user, as described above with respect to FIGS. 2A-2B. For example, optical system 306 may include a projector including electronic display 303 and a projection lens. The projection lens may further include a multi-functional DOE that functions as both a grating coupler to redirect light into a waveguide and as a lens element improving the imaging quality of the projector lens.

In the example of FIG. 4, software components 417 operate to provide an overall artificial reality application. In this example, software components 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices such as image capture devices 138, 238 or 102, controller(s) 114, and/or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
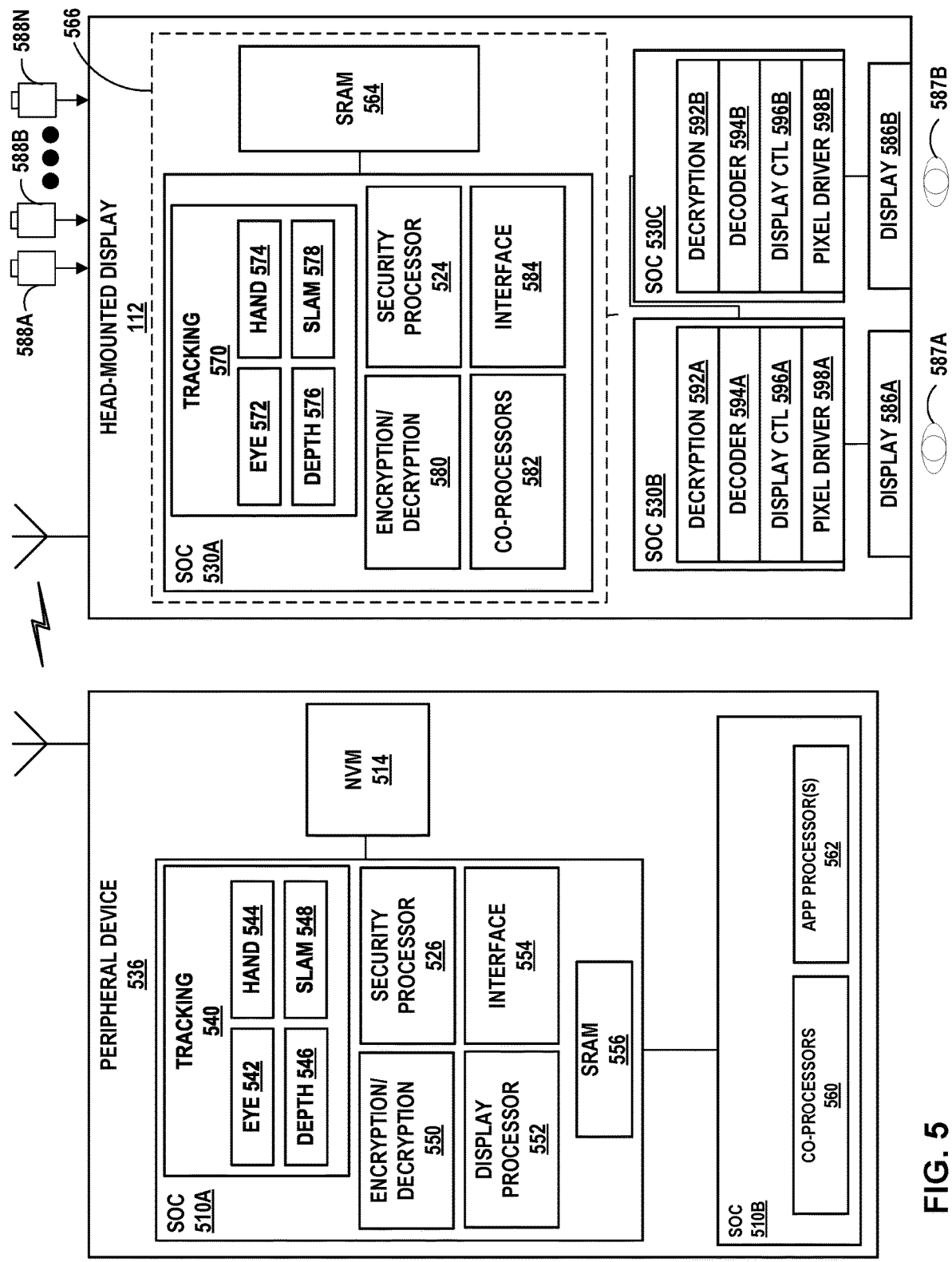
FIG. 5 is a block diagram illustrating an example implementation of a distributed architecture for a multi-device artificial reality system in which one or more devices are implemented using one or more systems-on-a-chip (SoCs) integrated circuits within each device and having wireless communication systems, in accordance with techniques described in this disclosure.

FIG. 5 is a block diagram illustrating an example implementation of a distributed architecture for a multi-device artificial reality system in which one or more devices (e.g., a peripheral device 536 and HMD 112) are implemented using one or more systems-on-a-chip (SoCs) integrated circuits within each device and having wireless communication systems, in accordance with techniques described in this disclosure. FIG. 5 illustrates an example in which HMD 112 operates in conjunction with peripheral device 536. Peripheral device 536 represents a physical, real-world device having a surface on which multi-device artificial reality systems, such as systems 100, overlays virtual content. Peripheral device 536 may include an interface 554 having one or more presence-sensitive surface(s) for detecting user inputs by detecting a presence of one or more objects (e.g., fingers, stylus, etc.) touching or hovering over locations of presence-sensitive surfaces. In some examples, peripheral device 536 may have a form factor similar to any of a smartphone, a tablet computer, a personal digital assistant (PDA), or other hand-held device. In other examples, peripheral device 536 may have the form factor of a smartwatch, a so-called "smart ring," or other wearable device. Peripheral device 536 may also be part of a kiosk or other stationary or mobile system. Interface 554 may incorporate output components, such as one or more display device(s), for outputting visual content to a screen. As described above, HMD 112 is architected and configured to enable the execution of artificial reality applications.

In this example, HMD 112 and peripheral device 536 include SoCs 530A, 510A, respectively, that represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. FIG. 5 is merely one example arrangement of SoC integrated circuits. The distributed architecture for a multi-device artificial reality system may include any collection and/or arrangement of SoC integrated circuits.

In the example of FIG. 5, HMD 112 includes SoC/SRAM integrated circuit component 566 in accordance with the techniques of the present disclosure. In particular, SoC/SRAM integrated circuit component 566 includes SoC 530A and a SRAM 564. SRAM 564 is separated or external (e.g., not on-die) from the processor(s) and other on-die circuitry of SoC 530A. Peripheral device 536, in this example, is implemented using a traditional SoC architecture, in which SoC 510A includes an on-die SRAM 556 and external (off-die) non-volatile local memory 514. In contrast, in accordance with the techniques of the present disclosure, SoC 530A does not include an external non-volatile local memory; instead, SRAM 564 of SoC/SRAM integrated circuit component 566 has sufficient memory capacity to perform the functions of both traditional on-die SRAM (such as SRAM 556) and external non-volatile local memory (such as NVM 514).

Head-mounted displays, such as HMD 112 as used in AR/VR systems as described herein, can benefit from the reduction in size, increased processing speed and reduced power consumption provided by the SoC/SRAM integrated circuit component 566. For example, the benefits provided by the SoC/SRAM integrated circuit component 566 in accordance with the techniques of the present disclosure can result in increased comfort for the wearer and a more fully immersive and realistic AR/VR experience.

In addition, any of SoCs 510 and/or 530 may be implemented using the SoC/SRAM integrated circuit component in accordance with the techniques of the present disclosure, and that the disclosure is not limited in this respect. Any of the SoCs 510 and/or 530 may benefit from the reduced size, increased processing speed and reduced power consumption provided by SoC/SRAM integrated circuit component 566. In addition, the benefits provided by the SoC/SRAM component in accordance with the techniques of the present disclosure are not only advantageous for AR/VR systems, but may also be advantageous in many applications such as autonomous driving, edge-based artificial intelligence, Internet-of-Things, and other applications which require highly responsive, real-time decision-making capabilities based on analysis of data from a large number of sensor inputs.

In this example, SoC 530A of HMD 112 comprises functional blocks including security processor 524, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 536 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 of SoC 530A is a functional block to encrypt outgoing data communicated to peripheral device 536 or a security server and decrypt incoming data communicated from peripheral device 536 or a security server. Co-processors 582 include one or more processors for executing instructions, such as a video processing unit, graphics processing unit, digital signal processors, encoders and/or decoders, AR/VR applications, and/or others.

Interface 584 of SoC 530A is a functional block that includes one or more interfaces for connecting to functional blocks of SoC 530B and/or 530C. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 536.

SoCs 530B and 530C of HMD 112 each represents display controllers for outputting artificial reality content on respective displays, e.g., displays 586A, 586B (collectively, "displays 586"). In this example, SoC 530B may include a display controller for display 586A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 586B to output artificial reality content for a right eye 587B of the user. For example, SoC 530C includes decryption 592B, decoder 594B, display controller 596B, and/or a pixel driver 598B for generating and outputting artificial reality content on display 586B. Displays 586 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

In this example, peripheral device 536 includes SoCs 510A and 510B configured to support an artificial reality application. In this example, SoC 510A comprises functional blocks including security processor 526, tracking block 540, an encryption/decryption block 550, a display processor 552, and an interface 554. Tracking block 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 536 may receive input from one or more accelerometers (also referred to as inertial measurement units or "IMUs") that output data indicative of current acceleration of peripheral device 536, GPS sensors that output data indicative of a location of peripheral device 536, radar or sonar that output data indicative of distances of peripheral device 536 from various objects, or other sensors that provide indications of a location or orientation of peripheral device 536 or other objects within a physical environment. Peripheral device 536 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 536 and, in accordance with the current pose, renders the artificial reality content to HMD 112.

Encryption/decryption block 550 of SoC 510A encrypts outgoing data communicated to HMD 112 or security server and decrypts incoming data communicated from HMD 112 or security server. Encryption/decryption block 550 may support symmetric key cryptography to encrypt/decrypt data using a session key (e.g., secret symmetric key). Display processor 552 of SoC 510A includes one or more processors such as a video processing unit, graphics processing unit, encoders and/or decoders, and/or others, for rendering artificial reality content to HMD 112. Interface 554 of SoC 510A includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

SoC 510B of peripheral device 536 includes co-processors 560 and application processors 562. In this example, co-processors 560 include various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 536.

Figure 6:
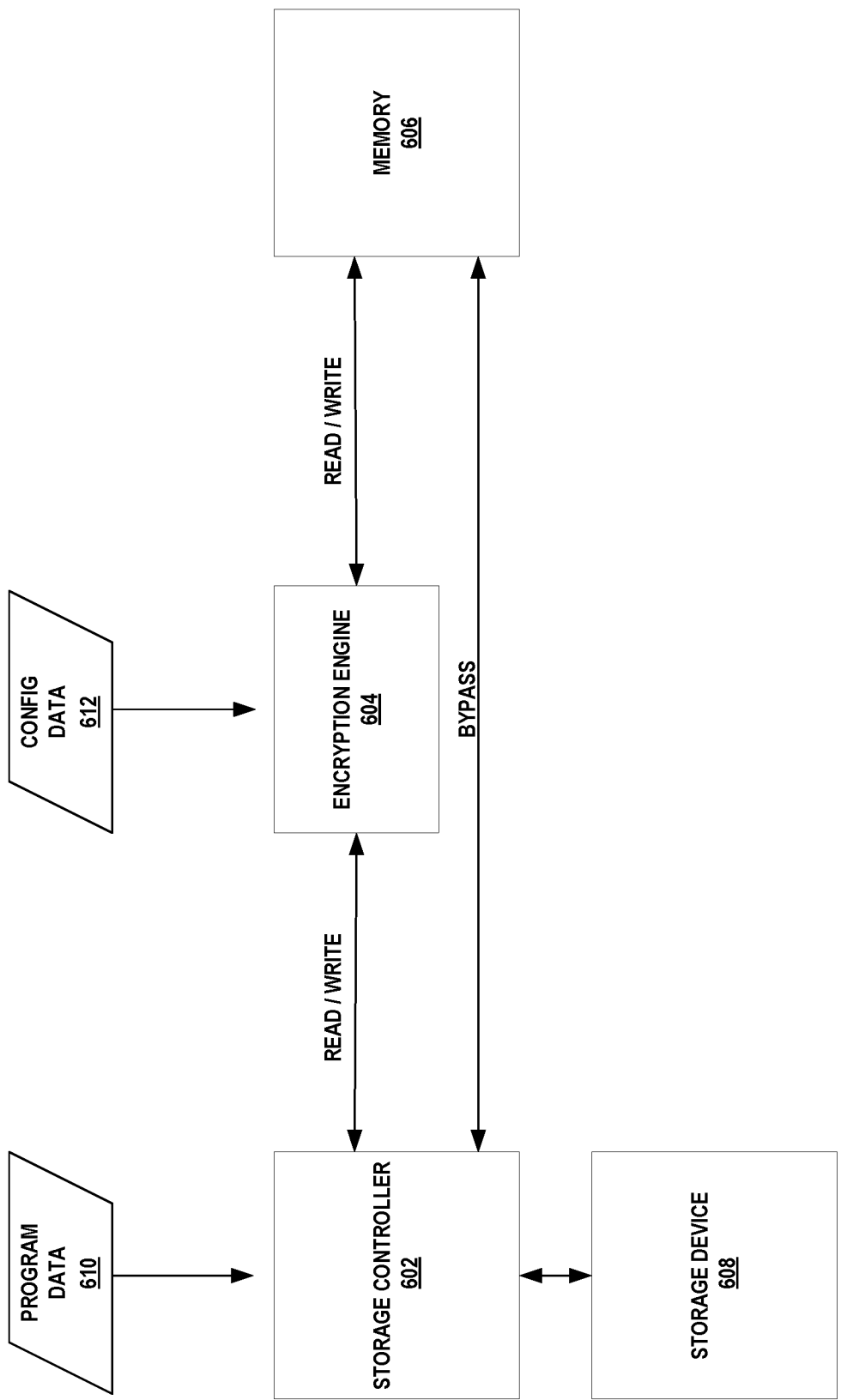
FIG. 6 is a conceptual diagram illustrating an in-line encryption/decryption data path within an SoC, in accordance with techniques described in this disclosure.

FIG. 6 is a conceptual diagram illustrating a logical view of an in-line encryption/decryption data path within an SoC, in accordance with techniques described in this disclosure. In the example illustrated in FIG. 6, storage controller 602 is configured to read and write data to storage device 608. In some aspects, storage controller 602 and storage device 608 can be an embedded Multi-Media Controller (eMMC) flash memory subsystem embedded on the SoC.

Encryption engine 604 can receive configuration data 612. For example, a security processor on the SoC can send configuration data 612 to encryption engine 604 via a secure key bus. In some aspects, configuration data 612 includes keys that can be associated with different subsystems of the SoC (subsystem keys) and/or applications (application keys) executing on subsystems of the SoC. Encryption engine 604 can store the keys in a key vault local to the encryption engine.

A host subsystem desiring to read or write secret data to or from storage device 608 can create program data 610 in a local memory of the SoC. Storage controller 602 can obtain program data 610 to cause the storage controller to read or write the secret data to storage device 608. In some aspects, program data 610 can be Advanced Peripheral Bus (APB) program data. In some aspects, program data 610 can include Advanced Direct Memory Access 2 (ADMA2) descriptors and command (CMD) descriptors that are combined into an ADMA3 descriptor (also referred to as an "integrated descriptor"). These descriptors provide parameters regarding the transfer such as the type of transfer, the address for the transfer, the size of the transfer etc. Program data 610 can identify the type of transaction (e.g., read or write) and a memory buffer in memory 606 to store data to be read from storage device 608 or source data to be written to storage device 608. Storage controller 602 can interpret the program data 610 and issue read or write commands to read data from or write data to storage device 608. In some aspects, the read and write commands may be Advanced eXtensible Interface (AXI) read and write commands.

Encryption engine 604 can process write commands prior to the raw data (also referred to a "clear text") being written to storage device 608. Encryption engine 604 can read program data 610 to determine a memory address of a memory buffer storing the raw data. Encryption engine 604 can determine an appropriate encryption key to obtain from the key vault based on the source of the write command and use the key to encrypt the source data prior to it being written to storage device 608 as secret data. Similarly, encryption engine 604 can process the read command prior to delivering data to the module or subsystem issuing the read command. The encryption engine can obtain an appropriate encryption key from the key vault based on the source of the read command. Encryption engine can read secret data from storage device 608 and use the key to decrypt the encrypted secret data. Encryption engine 604 can provide the decrypted data (e.g., the clear text data) to the source of the read command using parameters in the program data 610 associated with the read command to determine memory buffers in which to write the clear text data.

In some aspects, reads from and writes to storage device 608 by storage controller 602 bypass encryption engine 604, and storage controller 602 can read and write directly between memory 606 and storage device 608 via storage controller 602. For example, boot data (e.g., boot configuration data and/or boot executable code) may bypass encryption engine 604 when being read from or written to storage device 608.

Figure 7:
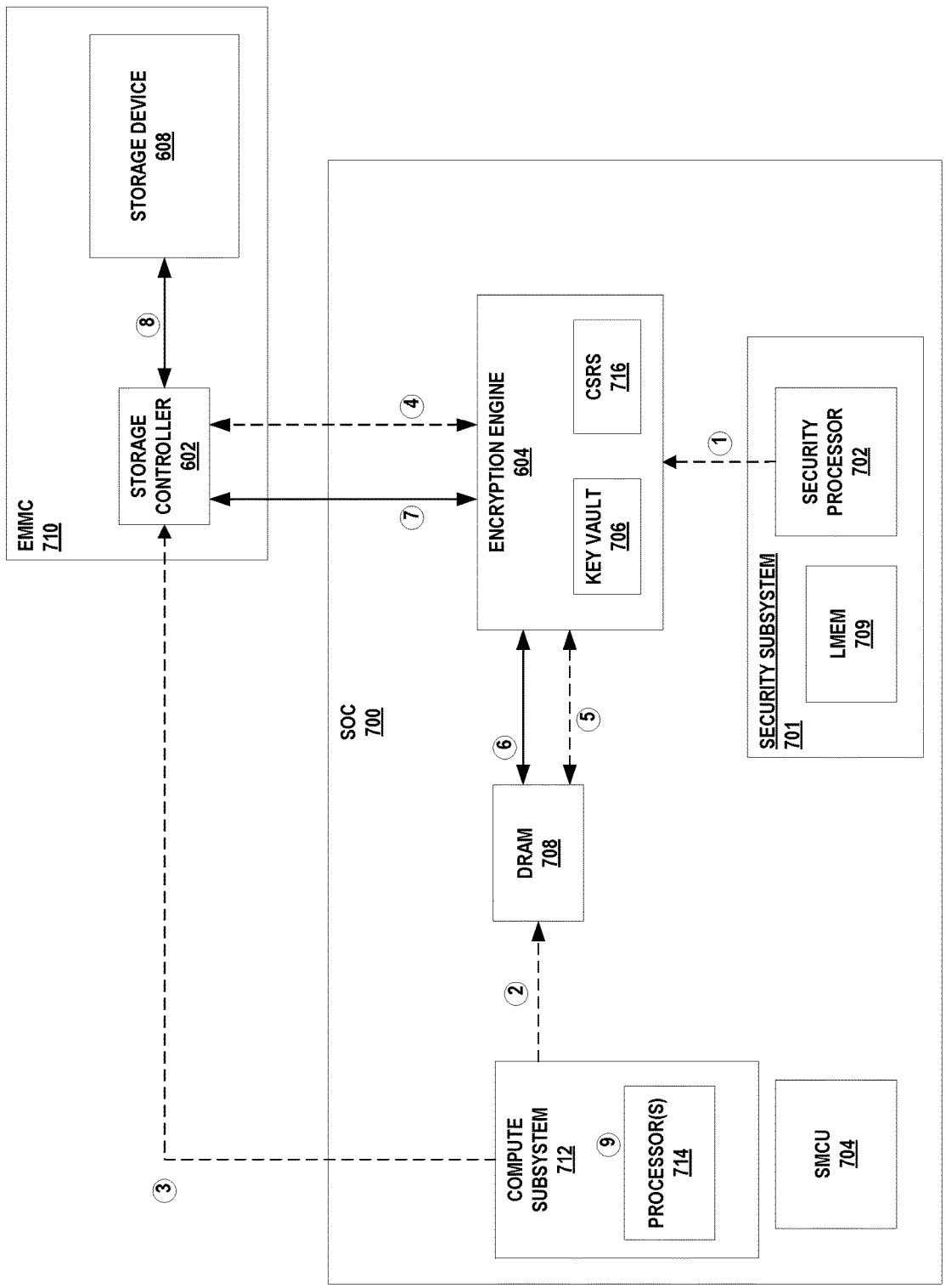
FIG. 7 is a conceptual diagram illustrating command and data flow in an example SoC, in accordance with techniques described in this disclosure.

FIG. 7 is a conceptual diagram illustrating example command and data flow for a command to write data to a storage device coupled to an SoC 700, in accordance with techniques described in this disclosure. SoC 700 may be any of SoCs 510 and 530 (FIG. 5). In the example shown in FIG. 7, SoC 700 includes security subsystem 701, compute subsystem 712, encryption engine 604, dynamic Random-Access Memory (DRAM) 708, security processor 702 and System Micro-Controller Unit (SMCU) 704. Command and storage data transfer operations are labeled in FIG. 7 as numbered round circles in FIG. 7. In the example shown in FIG. 7, command flow is indicated by dashed lines and data flow is indicated by solid lines.

SMCU 704 can orchestrate various operations on SoC 700. For example, SMCU 704 can orchestrate firmware loading, boot processing, debugging subsystems, etc.

In some implementations, as part of an initialization procedure, a security subsystem 701 generates key-pairs. Each of the key-pairs can be associated with a subsystem on the SoC 700 or an application executing on a subsystem of the SoC. In some aspects, a key-pair can be a Full Disk Encryption (FDE) key-pair or a File Based Encryption (FBE) key-pair. Security processor 702 can transfer the generated key-pairs to encryption engine 604 via a secure key bus (command operation 1). In some aspects, encryption engine 604 can maintain a key vault 706 having sixteen slots to store the key-pairs. In some aspects, only encryption engine 604 can access key vault 706. An index to a slot (referred to as a "slot index") can be associated with a subsystem or application and the slot index can be used to identify a key-pair to be used during read or write operations initiated by the corresponding subsystem or application. Security processor 702 can provide other configuration data (e.g., configuration data 612 of FIG. 6). As noted above, this configuration data can include access privilege configuration data that specifies access permissions to various partitions of storage device 608. For example, a first partition of storage device 608 may be reserved by a security subsystem to persistently store biometric data, while a second partition of storage device 608 may be reserved for secure operating system data and a third partition reserved for boot data. In some aspects, encryption engine 604 can store the access privilege configuration data in a set of Command Status Registers (CSRs) 716 of encryption engine 604. The partitions may be specified as ranges of storage device addresses ("address ranges"). For example, a first address range may define a first partition, a second address range may define a second partition and so forth.

In some aspects, encryption engine 604 can be configured to apply additional restrictions on key-pairs based, at least in part, on ownership of key-pairs. For example, encryption engine 604 can include a key ownership vector that may be set by security processor 702. The key ownership vector can define which keys in the key-vault belong to different initiators. For instance, the key ownership vector may indicate that the first eight key-pairs in key vault 706 may belong to security subsystem 701, the next four key-pairs in key vault 706 may belong to a component outside of security subsystem 701 (e.g., an operating system or application on compute subsystem 712), the next 4 key-pairs to some other subsystem, for example, an image capture subsystem associated with image capture devices 138, 238 etc. During data transfer, encryption engine 604 can match the key-identifier from the task descriptor data with the key ownership vector and allow the data transfer to take place if the initiator owns the key it is requesting for use.

A subsystem desiring to read or write secret data from/to storage device 608 can be referred to as a host subsystem. For example, compute subsystem 712 or security subsystem 701 may be host systems. A host subsystem that desires to read or write to storage device 608 prepares ADMA2 descriptors and Command (CMD) descriptors in a contiguous portion of memory that is accessible to storage controller 602 (e.g., DRAM 708 or local memory 709). In addition, the host subsystem prepares an ADMA3 descriptor (i.e., an integrated descriptor) that points to the ADMA2 and CMD descriptor pair. In some aspects, the ADMA3 descriptor is loaded into a predetermined memory range. In the example shown in FIG. 7, security subsystem 701 may load the ADMA3 descriptor into local memory 709 and compute subsystem 712 may load the ADMA3 descriptor into DRAM 708.

The host subsystem initiates the read/write transaction by configuring storage controller 602 with the address of the ADMA3 descriptor. For example, the host subsystem can configure a slot register set (SRS) of eMMC 710 with the address of the ADMA3 descriptor by writing SRS10 to select ADMA3 as a protocol and writing SRS30/SRS31 registers to indicate the address of the ADMA3 descriptor.

Storage controller 602 can fetch the ADMA3 descriptor. In some aspects, encryption engine 604 can snoop on a read address channel of storage controller 602 (e.g., an AXI read address channel) and can determine from the snooped data which subsystem owns the scheduled transaction (e.g., compute subsystem 712 or security subsystem 701 in the example shown in FIG. 7).

Encryption engine 604 can apply security access rules for the data transfer specified by the ADMA2 descriptor and CMD. Encryption engine 604 can utilize an access rule to determine if the host subsystem has sufficient privilege to access the addresses of storage device 608 specified in the ADMA2 descriptor. In some aspects, encryption engine 604 can compare the storage device addresses with a range of storage device address that the host subsystem is allowed to access. If the storage device address specified in the ADMA2 descriptor is within the allowed range, the transaction can continue. In some aspects, the host subsystem signs the descriptor using a shared secret (e.g., a pre-shared key) established by the host subsystem and encryption engine 604. Encryption engine 604 can validate the digital signature. If the digital signature is valid, encryption engine 604 can allow the transaction to continue.

In some aspects, encryption engine 604 can determine whether encryption/decryption is to be bypassed for the transaction. For example, a set of address ranges may identify bypass zones on storage device 608 where data written to a bypass zone is not encrypted. As an example, boot code may be unencrypted. In some aspects, encryption engine 604 may bypass encryption for other types of data. For example, encryption engine 604 can bypass the ADMA3 descriptor when it is read on the AXI read channel. Encryption engine 604 may validate the ADMA3 descriptor to ensure that the descriptor matches a target size (e.g., two 64 bit packets). Encryption engine 604 may also bypass CMD descriptors when snooped on the read data channel.

In some aspects, encryption engine 604 can snoop commands in the CMD descriptor to determine whether data will be encrypted/decrypted. In some aspects, single and multi-block read/write commands cause encryption engine 604 to encrypt/decrypt data specified by the ADMA3 descriptor. Other types of commands may be bypassed by encryption engine 604.

For commands where encryption engine 604 encrypts or decrypts data, encryption engine 604 determines a key-pair to be used for the encryption/decryption. In some aspects, encryption engine selects a key-pair associated with the host subsystem. In some aspects, the key-pair can be selected based on a key index identifying the key-pair associated with the host subsystem. For example, the key-index may identify a slot in key vault 706 that stores the key-pair.

The keys (e.g., key-pairs) in key vault 706 may be static keys or dynamic keys. A static key is one that may be derived from factors that are persistent, and can be recreated after powering off the device. These could be keys in non-volatile memory or keys derived from a user passcode. Static keys are used to encrypt long-lived data such as file systems, user information, device configuration etc. Dynamic keys can be keys that exist for a short term, e.g., one time usage. Such keys may be used, for example, to protect data in transit over Internet or other network communication.

In the case of commands associated with data to be encrypted or decrypted (e.g., single or multi-block reads and writes), encryption engine 604 can parse the ADMA descriptors chain (e.g., a group of TRN/LINK transfers) and selectively encrypt/decrypt the data using the selected key-par as the data is written or read by storage controller 602.

In the example shown in FIG. 7, compute subsystem 712 is configured to write data to the storage device 608. Processor 714 of compute subsystem 712 prepares ADMA2 and CMD descriptors and an ADMA3 descriptor pointing to the ADMA2 and CMD descriptors in DRAM 708 that is accessible to storage controller 602 (control operation 2).

Processor 714 then schedules the write with storage controller 602 (control operation 3). Encryption engine 604 obtains the ADMA3 descriptor, for example, by snooping a read line of storage controller 602. (control operation 4). Encryption engine 604 reads the ADMA2 and CMD descriptors (control operation 5). Encryption engine 604 can determine based on the ADMA2 and CMD descriptors whether or not the compute subsystem 712 has access to the desired storage device addresses and whether data is to be encrypted. Encryption engine 604 can obtain, from DRAM 708, the source data that will be written to storage device 608 (data operation 6). If the data is to be encrypted, encryption engine 604 can encrypt the data using the keypair associated with the compute subsystem (or an application on compute subsystem 712). Encryption engine 604 can provide the encrypted source data to storage controller 602 (data operation 7) which can write the encrypted data to the indicated storage address on storage device 608 (data operation 8). Storage controller 602 can signal processor 714 that the data transfer is complete (control operation 9). For example, storage controller 602 can generate an interrupt on processor 714.

In some aspects, encryption engine 604 can detect certain errors and trigger an interrupt on the host subsystem. Further, encryption engine can block data traffic flow. Examples of such conditions include:
Descriptors do not comply with expected size at various stages.
Data transfers are not 16B aligned.
ADMA descriptor tries to access restricted regions in storage device.
ADMA metadata requests a key ID that it is not allowed to use.

Figure 8:
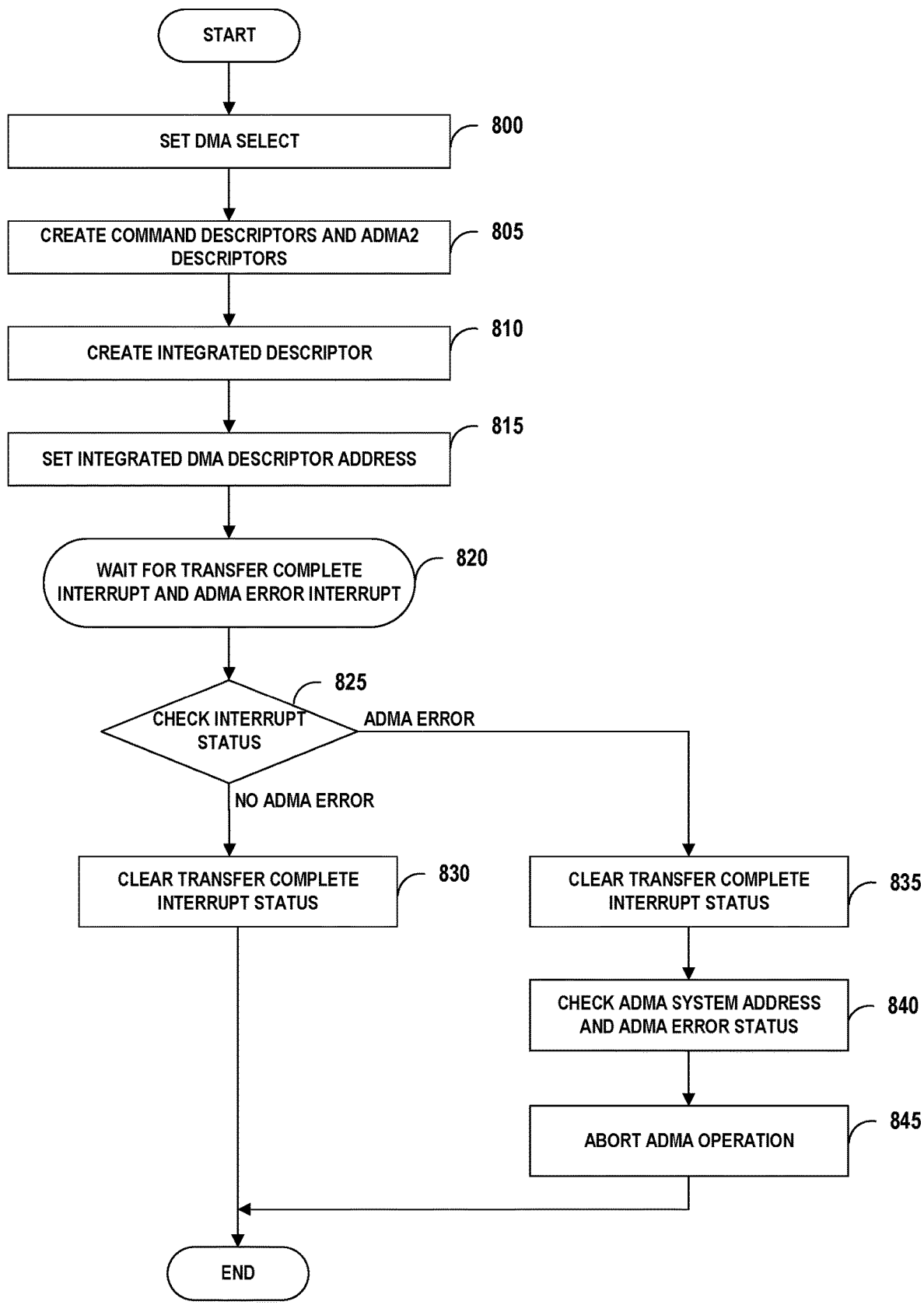
FIG. 8 is a flowchart illustrating host operations of a method for performing in-line encryption of data, in accordance with techniques described in this disclosure.

FIG. 8 is a flowchart illustrating host operations of a method for performing in-line encryption of data, in accordance with techniques described in this disclosure. A host processor or subsystem selects DMA mode for a memory transfer (800). The host may be an application processor, security processor or other subsystem processor on an SoC. In some aspects, the host selects ADMA3 mode. The host prepares ADMA2 descriptors and command descriptors that specify parameters for the DMA transfer (805). The descriptors can be written to contiguous memory that is accessible to the storage controller. The host then creates an ADMA3 (i.e., integrated) descriptor that references the ADMA2 and command descriptors (810). The host then prepares an integrated descriptor address in storage controller 602 (815). The ADMA3 descriptor points to the ADMA2 and command descriptor pair. The ADMA3 descriptor is loaded onto a predetermined memory range. For security subsystem initiated transfers, the ADMA3 descriptor may be available in a section of local memory accessible by the storage controller. For application subsystem initiated transfers the descriptors may be written to SoC DRAM.

The host initiates the DMA transfer can begin. For example, the host initiates the DMA transaction by configuring the storage controller's slot register set (SRS). In some aspects the host writes into SRS10 to select ADMA3, and then SRS30/SRS31 registers to indicate the address of the ADMA3 descriptor.

The host then waits for a signal (e.g., an interrupt) that the DMA transfer has been completed or that a DMA error has occurred (820). Upon receiving the signal, the host checks the interrupt status (825). If the interrupt status indicates no error has occurred (No ADMA error branch of 825), the host clears the transfer complete interrupt status (830). If the interrupt status indicates that an error has occurred (ADMA error branch of 825), the host clears the ADMA error interrupt status (835). The host checks the ADMA system address and ADMA error status to determine the cause of the error (840). The host can abort the DMA operation (845).

Figure 9:
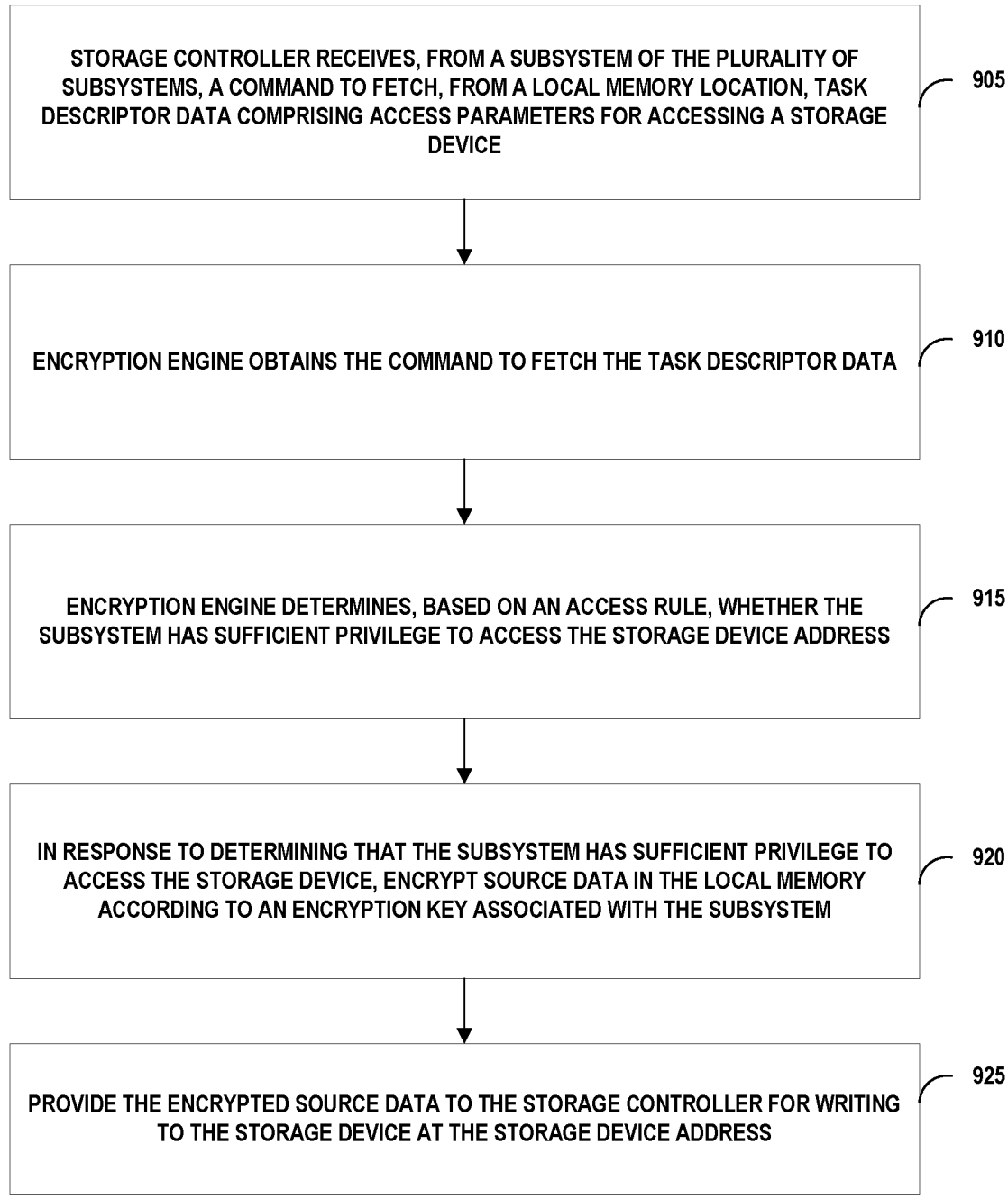
FIG. 9 is a flowchart illustrating encryption engine operations of a method for performing in-line encryption of data, in accordance with techniques described in this disclosure.

FIG. 9 is a flowchart illustrating encryption engine operations of a method for performing in-line encryption of data, in accordance with techniques described in this disclosure. As seen in the example of FIG. 9, a storage controller of the SoC may receive, from a subsystem of the plurality of subsystems, a command to fetch, from a local memory, task descriptor data comprising access parameters for accessing a storage device, the access parameters including a storage device address (905). Next, an encryption engine of the SoC may obtain the command to fetch the task descriptor data (910). Next, the encryption engine may determine, based on an access rule, whether the subsystem has sufficient privilege to access the storage device address (915). The encryption engine may, in response to determining that the subsystem has sufficient privilege to access the storage device, encrypt source data in the local memory according to an encryption key associated with the subsystem (920). Next, the encryption engine may provide the encrypted source data to the storage controller for writing to the storage device at the storage device address (925).

Figure 10A:
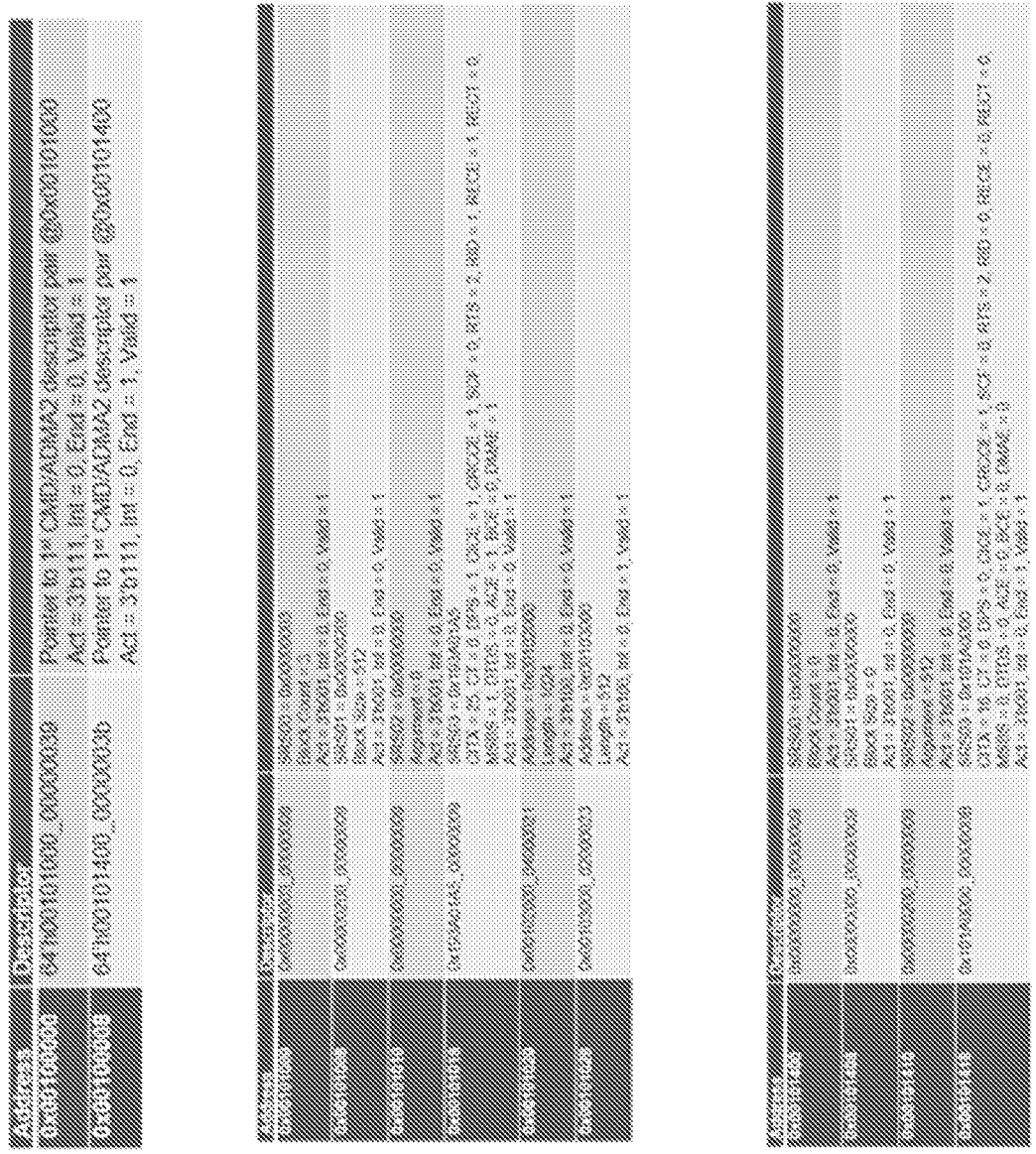
FIGS. 10A and 10B are conceptual diagrams illustrating example descriptor data and details of an example descriptor that includes a signature field, in accordance with techniques described in this disclosure.
Figure 10B:
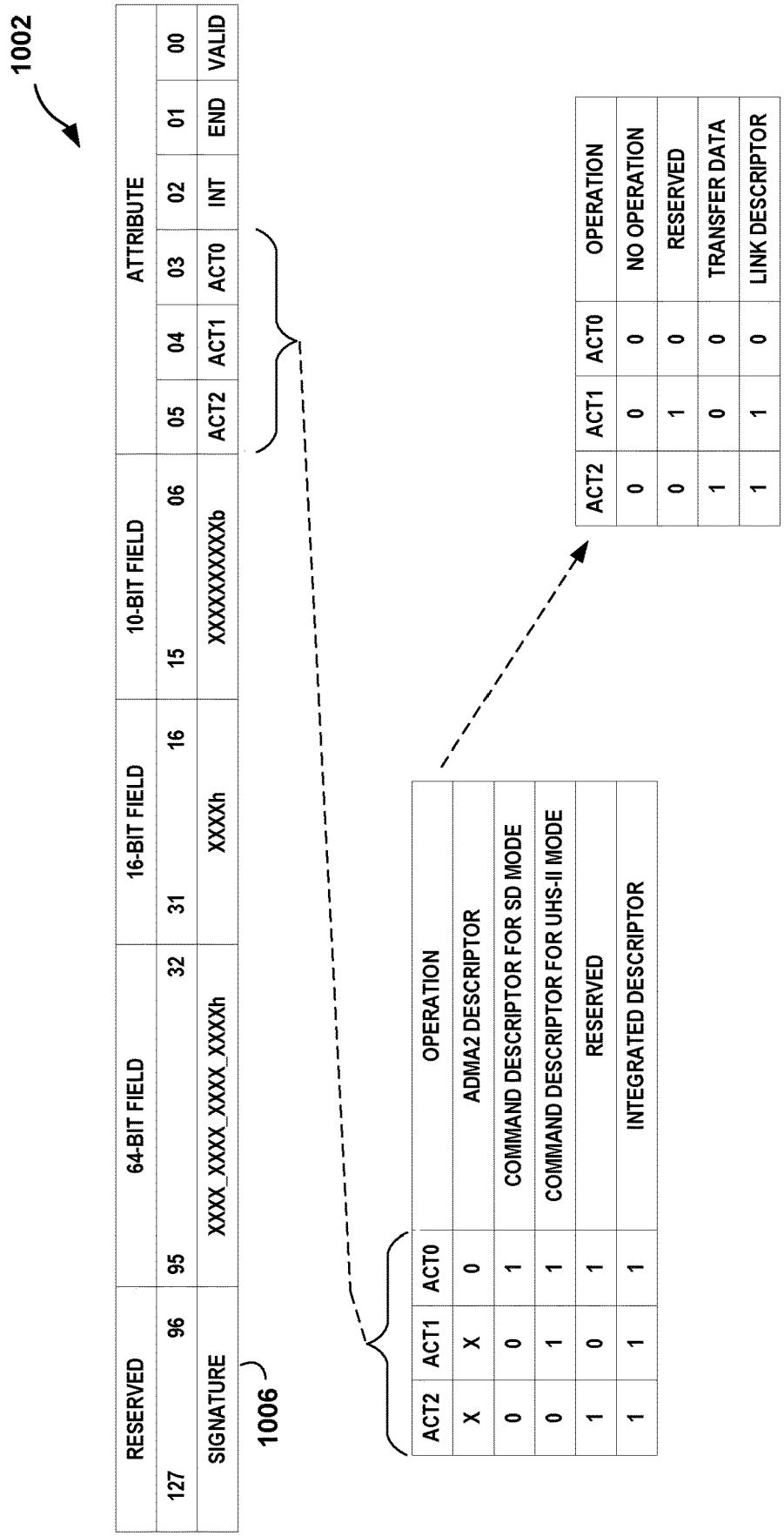

FIGS. 10A and 10B are conceptual diagrams illustrating example ADMA descriptor data and details of an example descriptor that includes a digital signature field, in accordance with techniques described in this disclosure. FIG. 10A shows example descriptor data as created by a host and processed by encryption engine 604. FIG. 10B illustrated a format for the descriptors of FIG. 10A. As shown in FIG. 10B, descriptor 1002 is a 128-bit descriptor having the indicated format. Reserved bits 96-127 of descriptor 1002 can be used to store a 32-bit digital signature. For example, a host subsystem can sign the descriptor according to a pre-shared key with encryption engine 604 (FIGS. 6 and 7) to create a 32-bit signature. The resulting digital signature 1006 can be validated by encryption engine 604 using the pre-shared key. If the signature is valid, encryption engine 604 can allow the read or write transaction created by the host subsystem to continue. If the signature is not valid, encryption engine 604 can terminate the transaction and indicate an error to the host subsystem.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A method for execution on a system on a chip (SoC) having a plurality of subsystems, the method comprising:
    configuring a storage controller to operate in a direct memory access mode;
    receiving, by the storage controller of the SoC and from a subsystem of the plurality of subsystems, a command to fetch, from a local memory, task descriptor data comprising access parameters for accessing a storage device, the access parameters including a storage device address;
    obtaining, by an encryption engine of the SoC, the command to fetch the task descriptor data, wherein obtaining the command includes snooping for the command on a read address channel of the storage controller;
    determining, by the encryption engine and based on an access rule, whether the subsystem has sufficient privilege to access the storage device address;
    in response to determining that the subsystem has sufficient privilege to access the storage device, encrypting, by the encryption engine, data in the local memory using an encryption key associated with the subsystem; and
    outputting, by the encryption engine, the encrypted data to the storage controller for writing to the storage device at the storage device address.

2. The method of claim 1, wherein determining whether the subsystem has sufficient privilege to access the storage device address comprises:
    comparing the storage device address to a range of permitted storage device addresses associated with the subsystem; and
    in response to determining that the storage device address is within the range of permitted storage device addresses associated with the subsystem, indicating that the subsystem has sufficient privilege to access the storage device address.

3. The method of claim 1, further comprising:
    creating, by the subsystem, a digital signature based on a shared secret between the subsystem and the encryption engine; and
    writing the digital signature to a field of the task descriptor data;
    wherein determining whether the subsystem has sufficient privilege to access the storage device address comprises validating the digital signature.

4. The method of claim 1, wherein the storage controller and the storage device comprise an embedded Multi-Media Card (eMMC), and wherein configuring the storage controller to operate in a direct memory access mode comprises:
    configuring the storage controller to operate in an Advanced Direct Memory Access 3 (ADMA3) mode.

5. The method of claim 1, further comprising:
    storing, by a security processor of a security subsystem of the plurality of subsystems, a plurality of keys in a key vault included within the encryption engine, wherein each key is associated with a corresponding subsystem of the plurality of subsystems of the SoC.

6. The method of claim 5, further comprising storing, in the key vault by the security processor, an application key associated with an application of the subsystem.

7. The method of claim 1, further comprising:
    determining, by the encryption engine, that the storage device address is within a range of storage device addresses that are not to be encrypted; and
    bypassing encryption of the data.

8. The method of claim 1, further comprising:
    in response to determining that the subsystem does not have sufficient privilege to access the storage device, indicating an error to the subsystem.

9. A system on a chip (SoC) comprising:
    a plurality of subsystems;
    a storage controller configured to operate in a direct memory access mode and further configured to receive, from a subsystem of the plurality of subsystems, a command to fetch, from a local memory, task descriptor data comprising access parameters for accessing a storage device, the access parameters including a storage device address; and
    an encryption engine configured to:
        obtain the command to fetch the task descriptor data, wherein to obtain the command to fetch the task descriptor data comprises to snoop for the command on a read address channel of the storage controller;
        determine, based on an access rule, whether the subsystem has sufficient privilege to access the storage device address;
        in response to determining that the subsystem has sufficient privilege to access the storage device, encrypt source data in the local memory according to an encryption key associated with the subsystem; and
        output the encrypted source data to the storage controller for writing to the storage device at the storage device address.

10. The SoC of claim 9, wherein to determine whether the subsystem has sufficient privilege to access the storage device address comprises:
    to compare the storage device address to a range of permitted storage device addresses associated with the subsystem; and
    in response to determining that the storage device address is within the range of permitted storage device addresses associated with the subsystem, indicate that the subsystem has sufficient privilege to access the storage device address.

11. The SoC of claim 9, wherein the subsystem is configured to:
   create a digital signature based on shared secret between the subsystem and the encryption engine; and
   write the digital signature to a field of the task descriptor data;
   wherein to determine, based on the access rule, whether the subsystem has sufficient privilege to access the storage device address comprises to validate, by the encryption engine, the digital signature.

12. The SoC of claim 9, wherein the storage controller and the storage device comprise an embedded Multi-Media Card (eMMC), and wherein the direct memory access mode is an Advanced Direct Memory Access 3 (ADMA3) mode.

13. The SoC of claim 9, further comprising:
   a security processor, the security processor configured to provide a plurality of keys to the encryption engine for storage in a key vault, wherein each key is associated with a corresponding subsystem of the SoC.

14. The SoC of claim 13, wherein a key of the plurality of keys comprises an application key associated with an application of the subsystem.

15. The SoC of claim 9, wherein the encryption engine is further configured to:
   bypass encryption of the source data in response to a determination that the storage device address is within a range of storage device addresses that are not to be encrypted.

16. The SoC of claim 9, wherein the encryption engine is further configured to:
   in response to a determination that the subsystem does not have sufficient privilege to access the storage device, indicate an error to the subsystem.

17. The SoC of claim 9, wherein the SoC is configured to support an artificial reality application.

18. An artificial reality system comprising:
   a storage device;
   a head mounted display (HMD) configured to output artificial reality content, the HMD including at least one system on a chip (SoC), wherein the at least one SoC comprises:
   a plurality of subsystems;
   a storage controller configured to operate in a direct memory access mode and further configured to receive, from a subsystem of the plurality of subsystems, a command to fetch, from a local memory, task descriptor data comprising access parameters for accessing the storage device, the access parameters including a storage device address; and
   an encryption engine configured to:
      obtain the command to fetch the task descriptor data, wherein to obtain the command to fetch the task descriptor data comprises to snoop for the command on a read address channel of the storage controller;
      determine, based on an access rule, whether the subsystem has sufficient privilege to access the storage device address;
      in response to determining that the subsystem has sufficient privilege to access the storage device, encrypt source data in the local memory according to an encryption key associated with the subsystem; and
      output the encrypted source data to the storage controller for writing to the storage device at the storage device address.

* * * * *